US006605913B2

(12) United States Patent
Bonduel

(10) Patent No.: US 6,605,913 B2
(45) Date of Patent: Aug. 12, 2003

(54) PROCESS AND DEVICE FOR MONITORING THE POSITION OF AN ELECTRIC WINDOW, ROOF OR DOOR OF A VEHICLE, AND PARTICULARLY AN AUTOMOBILE

(75) Inventor: Pascal Bonduel, Bouzy la Foret (FR)

(73) Assignee: Valeo Electronique, Creteil (FR)

( * ) Notice: Subject to any disclaimer, the term of this patent is extended or adjusted under 35 U.S.C. 154(b) by 37 days.

(21) Appl. No.: 09/808,111

(22) Filed: Mar. 15, 2001

(65) Prior Publication Data

US 2002/0005701 A1 Jan. 17, 2002

(30) Foreign Application Priority Data

Mar. 15, 2000 (FR) ........................................... 0003299

(51) Int. Cl.[7] ................................................ H02P 3/00
(52) U.S. Cl. ............................ 318/467; 318/286; 49/28
(58) Field of Search ................................ 318/466–472, 318/280–292; 49/26, 27, 28, 118

(56) References Cited

U.S. PATENT DOCUMENTS 5,616,997 A * 4/1997 Jackson et al. ............. 318/467
5,682,090 A 10/1997 Shigematsu et al.
5,708,338 A * 1/1998 Cook et al. ................. 318/466

FOREIGN PATENT DOCUMENTS

DE 19718631 11/1998

* cited by examiner

*Primary Examiner*—Khanh Dang
(74) *Attorney, Agent, or Firm*—Liniak, Berenato & White

(57) ABSTRACT

Process for determination of the position of a door, window or roof of an automobile vehicle, according to which the angular position of the rotor of the electric motor actuating this door, window or roof is determined and the position of the door, window or roof is calculated as a function of the said angular position. The position of the door, window or roof is calculated by correcting a theoretical position that depends on the angular position by a term that takes account of the stiffness of the mechanical transmission between the door, window or roof and the electric motor, this term being a function of the motor power supply current. The device embodying this process is advantageously used in an electric window winder.

8 Claims, 1 Drawing Sheet

PROCESS AND DEVICE FOR MONITORING THE POSITION OF AN ELECTRIC WINDOW, ROOF OR DOOR OF A VEHICLE, AND PARTICULARLY AN AUTOMOBILE

BACKGROUND OF THE INVENTION

1. Field of the Invention

This invention relates to a process and device for monitoring the position of an electric window, roof or door of a vehicle, and particularly an automobile.

It is particularly advantageous for applications in electrical control systems for vehicle windows, and control systems for opening roofs, sliding doors, etc.

2. Description of Related Art

In this system, conventionally it is considered that the position of the door, window or roof for which the displacement is being monitored is a linear function of the angular position of the rotor of the electric actuating motor.

However, it has been found that determinations of window, roof and door positions used in systems known in the past have not been reliable.

This is why sensors are usually provided in window winding mechanisms that are independent from the sensors provided to monitor rotation of the rotor of the electric motor and that are used to detect when the window reaches its limit stop.

SUMMARY OF THE INVENTION

One purpose of this invention is to overcome this disadvantage.

Consequently, the invention proposes a process for determining the position of a vehicle (particularly an automobile) door, roof or window, and particularly a window, according to which the angular position of the rotor of the electric motor actuating this window or door is determined, and the position of the window or door is calculated as a function of the said angular position, characterized in that the position of the door, window or roof is calculated by correcting the theoretical position that depends on the angular position by a term taking account of the stiffness of the mechanical transmission between the door, window or roof and the electric motor.

The position determined with this type of process is much more reliable than previously known means of determining positions.

It is found that, particularly for rack type window winding systems but and also for twisted cable window winding systems, the elasticity of the drive system between the motor rotor and the door, window or roof may be significant. The processing proposed by the invention compensates for this elasticity.

Advantageously, the correction term depends on the motor power supply current.

In one preferred embodiment, the position X of the door, window or roof is estimated using the following equation, which will need to be factored:

$$X=Rc.[\theta-K(I)]$$

where:

Rc is the dynamic ratio of the mechanical transmission.

I is the current consumed in the DC motor.

K is the mechanical stiffness function.

The function K is preferably a linear function of I.

The invention also proposes a device to determine the position of a door, window or roof of a vehicle (particularly an automobile) comprising means of determining the angular position of the rotor of the electric motor actuating this door, window or roof and means of calculating the position of the door, window or roof as a function of the said angular position, characterized in that the said means embody the process mentioned above.

It also proposes a device for controlling an electric motor causing a displacement of a door, window or roof of an automobile vehicle, characterized in that it comprises a device of the type mentioned above.

Furthermore, the invention proposes an electric window winder for a vehicle, particularly an automobile, comprising at least one carriage that supports the window and that is driven in displacement by an electric motor, characterized in that it comprises such a control device.

BRIEF DESCRIPTION OF THE DRAWINGS

Other characteristics and advantages of the invention will appear in the following description which is given for illustration purposes only and is in no way limitative, and which shall be read with regard to the single FIGURE in the appendix that diagrammatically represents an electric window winder for an automobile vehicle that comprises a device conform with one possible embodiment of the invention.

DETAILED DESCRIPTION OF PREFERRED EMBODIMENTS

Figure 1:
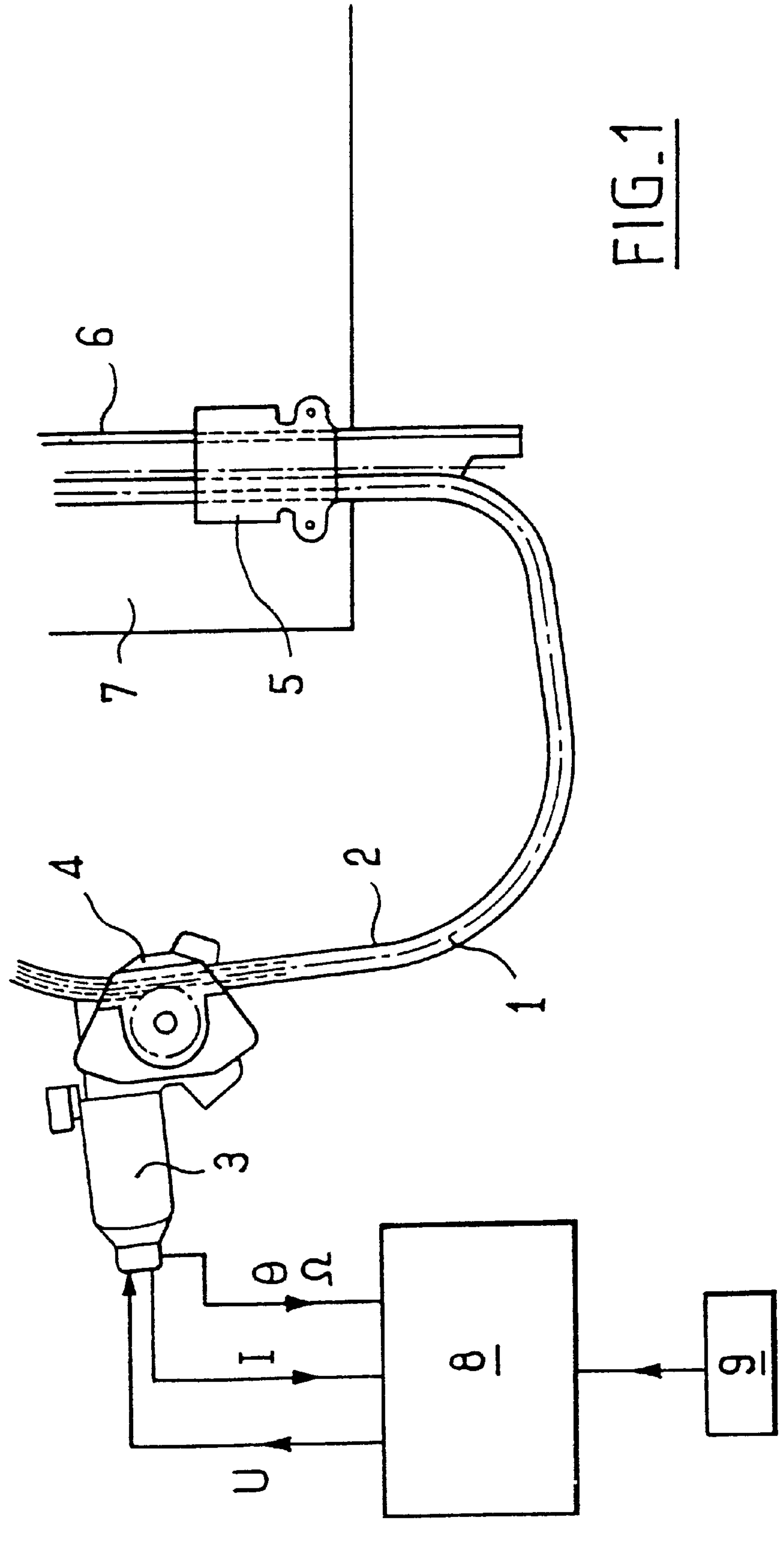

The window winder mechanism illustrated in FIG. 1 is of the rack and cable type.

It comprises a rack and cable 1 sliding in a duct 2, and an electric motor 3 coupled to reduction means 4 that drive the said cable 1.

This cable 1 applies a sliding movement to a carriage 5 on which a window 7 is supported. This carriage 5 is moved in the upwards or downwards direction along a vertical guide rail 6 and drives the window 7 with it.

The electric motor 3 is a DC motor, in which the power supply voltage U is controlled by management unit 8.

This management unit 8 receives information from sensors (not shown) that it uses to determine the speed $\Omega$ and the angular position $\theta$ of the rotor of motor 3.

For example, these sensors may be Hall effect sensors.

The management unit 8 also receives information about the current I passing through the motor 3, from a shunt circuit (not shown).

It also receives information about actuation of control devices 9, from these control devices.

Depending on the different information available, and particularly as a function of the speed $\Omega$ and the angular position $\theta$ of the rotor of motor 3, the management unit 8 manages the power supply to the electric motor 3.

In particular, it detects trapping and it controls the electric motor 3 in the opposite direction as soon as its speed tends to become 0 if window 7 has not reached its limit stop.

It also monitors the position of the window 7 in a reliable way.

In particular, this monitoring enables it to control the motor 3 so as to determine a limit stop position for the window with excellent precision, without it being necessary to provide limit stop position sensors on the guide rail 6.

In order to implement this monitoring, the management unit 8 determines the position of the window 7 by correcting a calculated theoretical position as a function of the angular position 0 of the rotor of motor 3 using a term that takes account of the elasticity of the dynamic system.

This term is advantageously a function of the current consumed by the motor 3 which is proportional to the torque supplied by the said motor.

For example, the position X of the window 7 along rail 6 is estimated using a formula of the following type:

$$X=Rc.[\theta-K(I)]$$

to which a factor is applied.

where:

Rc is the dynamic ratio of the mechanical transmission (in mm/rad).

I is the current consumed in the DC motor (in A).

K is the mechanical stiffness function (in rad/A) (that may be a transfer function or a proportionality parameter).

What is claimed is:

1. Process for determining the position of at least one of a vehicle door, window and roof, according to the following steps:

determining the angular position of the rotor of the electric motor actuating said window, roof and door, calculating a theoretical angular position of at least one of a window, roof and door as a function of said angular position, and correcting the theoretical angular position of the door, window and roof by a term taking account of and being a function of an elasticity and stiffness of a drive system including transmission elements extending between the door, window and roof and the electric motor.

2. Process according to claim 1, characterized in that the said term depends on the motor power supply current.

3. Process according to claim 2, characterized in that the position X of the door, window or roof is estimated using the following equation, which will need to be factored:

$$X=Rc.[\theta-K(I)]$$

where:

Rc is the dynamic ratio of the mechanical transmission;

I is the current consumed in the DC motor;

K is the mechanical stiffness function.

4. Process according to claim 3, characterized in that function K is a linear function of I.

5. Process for the determination of the position of a window of a vehicle, particularly an automobile, moved in displacement by an electric motor, characterized in that it uses the process according to one of claims 1 to 4.

6. Device for determining the position of a door, window or roof of a vehicle, and particularly an automobile, comprising means of determining the angular position of the rotor of the electric motor actuating this door window, and means of calculating the position of the door, window or roof as a function of the said angular position, characterized in that the said means embody the process according to one of claims 1 to 5.

7. Device for controlling an electric motor displacing a door, window or roof of an automobile vehicle, characterized in that it comprises a device according to claim 6.

8. Electric window winder of a vehicle, particularly an automobile, comprising at least one carriage that supports the window and is displaced by an electric motor, characterized in that it comprises a control device according to claim 7.

* * * * *